3,282,060
SEPARATION OF NATURAL GASES
George E. Hays, Bartlesville, Okla., assignor to Phillips Petroleum Company, a corporation of Delaware
Continuation of application Ser. No. 168,667, Jan. 25, 1962. This application Nov. 9, 1965, Ser. No. 514,736
6 Claims. (Cl. 62—24)

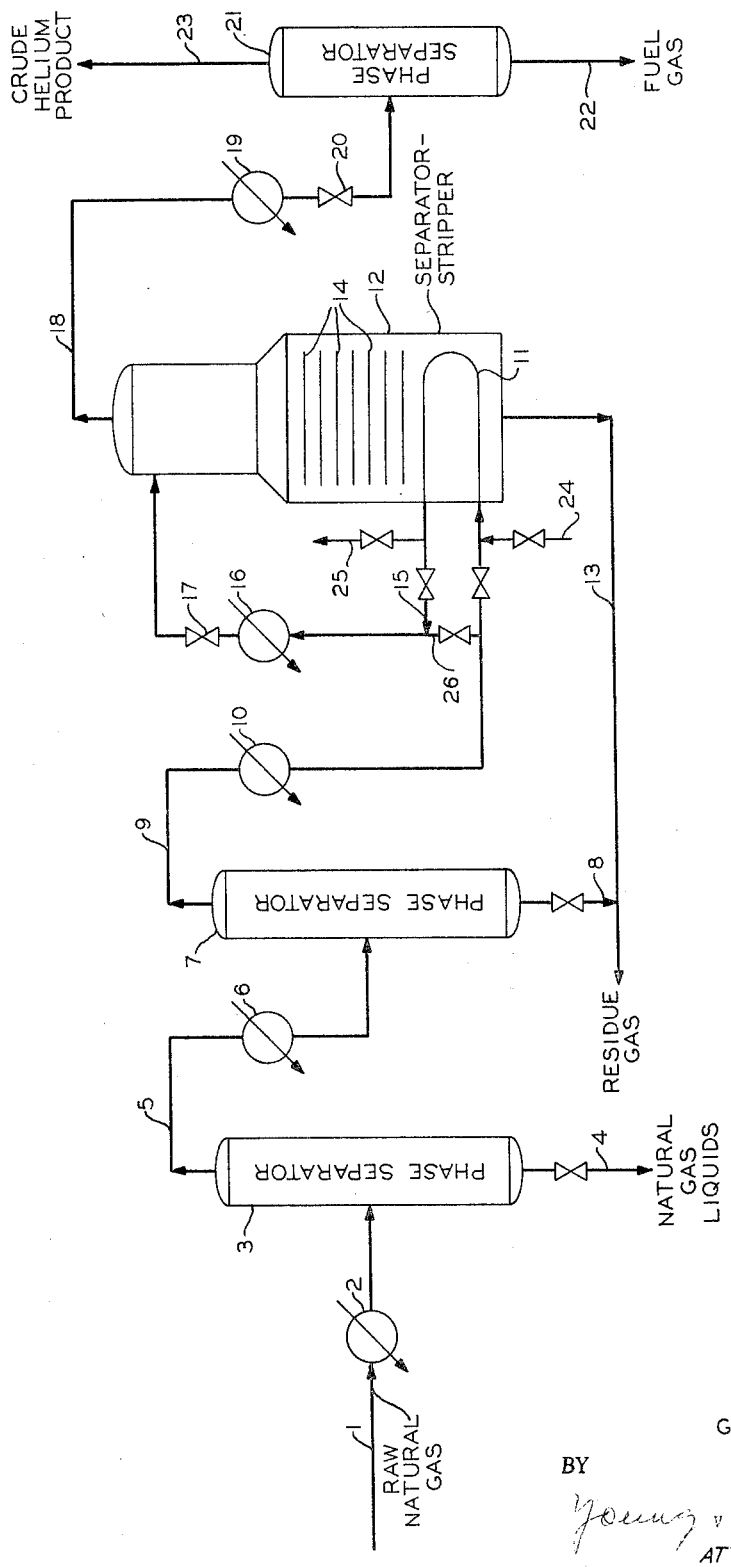

This application is a continuation of Serial No. 168,667, filed January 25, 1962, of George E. Hays.

This invention relates to method and apparatus for separating gases. In one aspect, the invention relates to method and apparatus for recovery of helium from gas wherein, in a multiple-stage condensation-phase separation system, helium losses in a removed liquid stream are reduced by stripping the stream. In another aspect, the invention relates to method and apparatus for reducing loss of dissolved helium in a liquid stream withdrawn from a multiple-stage condensation-phase separation gas fractionation system by stripping the withdrawn stream utilizing in indirect heat exchange the stream prior to its stripping.

The value of helium as an inert atmosphere, a component of an artificial breathing medium, a lifting gas, and other diverse uses has been known. The world supply of naturally-available helium is limited to very few geographical locations, most of which are within the continental United States, and is further limited so far as is presently known as being a minor constituent of natural gas. Various efforts have been made in the past to recover the helium from such a gas mixture economically, and have met with greater or lesser success.

Accordingly, it is an object of my invention to provide method and apparatus for separating a gas mixture. It is another object of my invention to provide economical method and apparatus for recovering helium from a gas mixture containing helium. It is another object of my invention to provide method and apparatus for recovering increased amounts of helium from natural gas. It is a still further object of this invention to recover helium from the gaseous phase of condensed natural gas.

Other aspects, objects and the several advantages of my invention will become apparent from a study of this disclosure, the drawing, and the appended claims.

According to my invention, there are provided method and apparatus for separating a gas containing helium which comprises cooling the gas to condense liquid, separating condensed liquid from the gas, expanding the remaining gas stream to produce additional liquid, reboiling the liquid so as to strip helium therefrom, removing the stripped liquid as a product, further cooling and expanding gases resulting from the stripping so as to produce additional liquid, separating the additional liquid, and recovering the remaining gas as a crude helium product.

Reference is now made to the drawing, which is a flow diagram of a preferred embodiment of my invention, for a more complete understanding of the invention.

Raw natural gas, which can have previously been treated for removal of undesired constituents, is passed by way of conduit 1 through a cooler 2 to a phase separator 3. Liquids, such as natural gas liquid, which were condensed in cooler 2 are withdrawn from this phase separator by way of conduit 4 to further utility. Uncondensed vapors are passed overhead by way of conduit 5 through a cooler 6 to a second phase separator 7. Liquids, such as a liquefied residue gas, which were condensed in cooler 6 are withdrawn from this phase separator by way of conduit 8 to further utility. Remaining uncondensed vapors are passed overhead by way of conduit 9 through a cooler 10 to a heat-exchange bundle 11 in the combined separator-stripper 12. Vessel 12 serves both as a vapor-liquid phase separator, separating out liquids condensed by cooler 10, and as a stripper to remove most of the dissolved helium from the condensed liquid. This condensed liquid residue gas, which is primarily methane, is removed by way of conduit 13 to further utility and can, if desired, be combined with the stream in conduit 8. The stripping action is abetted by a series of vapor-liquid contacting devices 14, which can be, for example, bubble-cap or sieve trays. Instead of trays, stripper 12 may contain packing such as rings, saddles, etc. After the mixed vapor-liquid stream in conduit 9 has given up some of its heat in exchanger 11, it is passed by way of conduit 15 through a cooler 16 and an expander 17. Coolers 10 and 16 can be alternative, i.e., either one can be used without the other, or both can be used as shown in the drawing. This will depend, as is known in the art, upon the temperatures and pressures of the streams desired and available and upon the surface areas of the respective coolers, although according to a presently-preferred embodiment of the invention, cooler 16 is not needed. Expander 17 can be a throttling valve, turbine, or other means of expanding a gas and its use results in additional temperature lowering of the stream in conduit 15. The expanded stream is passed into an upper portion of vessel 12 where the condensed portion is refluxed and stripped as previously discussed. Vapors resulting from the uncondensed portion of stream 15 and from the stripping are collected and passed overhead by way of conduit 18 through cooler 19 to a second expander 20. This expander can be similar to the one previously described; the action of cooler 19 and expander 20 effect condensation of additional liquid in stream 18, and the resulting stream is passed to vapor-liquid phase separator 21. The condensed liquid is withdrawn from phase separator 21 by way of conduit 22 to further utility, for example, as a fuel gas, and the residual uncondensed vapors are withdrawn from separator 21 by way of conduit 23. These residual vapors comprise a crude helium product and can be utilized as such or further treated as desired.

Although, as shown on the drawing, it is presently preferred that the heat for reboiling stripper 12 be furnished by stream 9 in order that the latter stream is thereby cooled, it is also contemplated that stripping heat for vessel 12 be furnished from an external stream. Accordingly, conduits 24, 25 and 26 are shown along with their associated block valves so that gas in conduit 9 can pass by way of conduit 26 directly to cooler 16, by-passing heat exchange bundle 11. In this instance, heat is supplied to bundle 11 by a suitable fluid by way of conduits 24 and 25.

The source of cooling on the "cold side" of coolers 2, 6, 10 and/or 16, and 19 can be an external source of refrigeration, although it is presently preferred that the various product streams serve as a source of cold. For example, streams 22 and/or 23 can be passed sequentially through the cold side of coolers 19, 16 and/or 10, 6 and 2; stream 13 can be passed sequentially through coolers 16 and/or 10, 6 and 2; and stream 8 can be passed sequentially through coolers 6 and 2. Stream 4 can also be passed through cooler 2. Use of these product streams to countercurrently cool the various stages has been left off the drawing for sake of clarity. Phase separators 3, 7, 12 and 21 are operated to separate vapor from liquid as is known in the art and can utilize, for example, valves in the liquid effluent streams therefrom controlled in response to liquid level therein.

The following specific example will serve to more fully illustrate my invention. Compositions given are for the total mixture.

EXAMPLE

| Stream No. | Temp., °F. | Press., p.s.i.a. | Composition, mol percent | | | | | | |
|---|---|---|---|---|---|---|---|---|---|
| | | | He | N₂ | CH₄ | C₂H₆ | C₃H₈ | C₄H₁₀ | C₅H₁₂₊ |
| 1 (after cooler 2) | −80 | 345 | 0.75 | 14.84 | 71.72 | 6.19 | 4.09 | 1.68 | 0.73 |
| 4 | −130 | 21 | Trace | 1.40 | 26.52 | 21.27 | 30.38 | 14.04 | 6.39 |
| 5 (after cooler 6) | −165 | 343 | 0.84 | 16.52 | 77.46 | 4.29 | 0.77 | 0.11 | 0.01 |
| 8 | −180 | 224 | 0.02 | 5.47 | 82.52 | 9.86 | 1.83 | 0.27 | 0.03 |
| 9 (after cooler 10)¹ | −197 | 340 | 1.44 | 24.47 | 73.82 | 0.27 | Trace | | |
| 13 | −207 | 225 | 0.01 | 16.05 | 83.59 | 0.35 | Trace | | |
| 15 (after expander 17)¹ | −212 | 225 | 1.44 | 24.47 | 73.82 | 0.27 | Trace | | |
| 18 (after expander 20) | −294 | 75 | 6.68 | 55.65 | 37.67 | | | | |
| 22 | −294 | 75 | 0.03 | 57.33 | 42.64 | | | | |
| 23 | −294 | 75 | 52.38 | 43.27 | 4.35 | | | | |

¹ Cooler 16 is not used in this example.

In the example, separator-stripper 12 has a top section 3½ feet in diameter by 5 feet high and a bottom section 8½ feet in diameter by 8 feet high; the bottom section may contain 9 trays on 8″ spacing and is referred to in the drawing as item 14. Alternately, the bottom section may contain about 5 feet of packing such as rings or saddles. The heat exchange area of bundle 11 is 3350 sq. feet.

Reasonable variation and modification are possible within the scope of this disclosure, the drawing, and the appended claims to the invention the essence of which is that there are provided a method and apparatus for separation of helium from a gaseous mixture by cooling and separating out liquid from the mixture, further cooling the uncondensed gases to produce additional liquid, reboiling the condensed liquid to strip dissolved helium therefrom, and further cooling and phase separating remaining uncondensed gases to recover a helium product.

I claim:

1. Gas separation apparatus comprising first indirect cooling means, conduit means communicating between a supply of mixed gases containing helium and said first cooling means, first vapor-liquid phase separator means, conduit means communicating between said first cooling means and said first separator means, conduit means communicating with a lower portion of said first separator means and adapted to withdraw a liquid therefrom, second indirect cooling means, conduit means communicating between said second cooling means and an upper portion of said first separator means and adapted to pass a vapor from said first separator means to said second cooling means, combined separator-stripper means comprising vapor-liquid contacting means disposed above an indirect heat exchange means, conduit means communicating between said second cooling means and said indirect heat exchange means, first expansion means, conduit means communicating between said indirect heat exchange means and said first expansion means, conduit means communicating between said first expansion means and a region above said vapor-liquid contacting means and adapted to pass a mixture of vapor and liquid from said first expansion means onto said vapor-liquid contacting means, conduit means communicating with a region below said indirect heat exchange means and adapted to withdraw a stripped liquid from said region, second expansion means, conduit means communicating between said second expansion means and a region above said vapor-liquid contacting means and adapted to pass a vapor from said region above said vapor-liquid contacting means to said second expansion means, second phase separator means, conduit means communicating between said second expansion means and said second phase separator means, conduit means adapted to withdraw a liquid from a lower region of said second phase separator means, and conduit means adapted to withdraw a crude helium-containing vapor product from an upper region of said second phase separator means.

2. The method of recovering helium from a mixture of gases which comprises:

(a) cooling the mixture of gas to effect a separation of a liquid phase;
(b) further cooling the gas phase to partially liquefy the gas;
(c) passing said partially liquefied gas through a reboiler zone of a separator-stripper and then to further cooling before expansion and introduction into said stripper for refluxing and stripping;
(d) removing the gas overhead from the stripper for cooling; expansion and separating into a liquid fuel gas phase and a crude helium product.

3. The method of recovering helium from a mixture of gases which comprises:

(a) cooling the mixture of gas to effect a separation of a liquid phase;
(b) further cooling the gas phase to effect a second separation of a liquid phase;
(c) further cooling the gas phase to partially liquefy the gas;
(d) passing said partially liquefied gas through a reboiler zone of a separator-stripper and then to further cooling before expansion and introduction into said stripper for refluxing and stripping;
(e) removing the gas overhead from the stripper for cooling, expansion and separating into a liquid fuel gas phase and a crude helium product.

4. The method of claim 3 further comprising the step of combining the liquid phase of the stripper with the liquid separated in said second separation step.

5. The method of claim 4 wherein said mixture of gases is raw natural gas.

6. The method of recovering helium from a mixture of gases which comprises:

(a) cooling the mixutre of gas to effect a separation of a liquid phase;
(b) further cooling the gas phase to partially liquefy the gas;
(c) passing said partially liquefied gas through a reboiler zone of a separator-stripper before expansion and introduction into said stripper for refluxing and stripping;
(d) removing the gas overhead from the stripper for cooling, expansion and separating into a liquid fuel gas phase and a crude helium product.

References Cited by the Examiner

UNITED STATES PATENTS

| 1,529,625 | 3/1925 | Rafferty et al. | |
| 1,664,412 | 4/1928 | Haynes | 62—31 X |
| 1,676,225 | 7/1928 | Tolman | 62—22 |
| 1,723,425 | 8/1929 | Jaubert. | |
| 1,850,529 | 3/1932 | Bottoms | 62—27 |
| 2,012,080 | 8/1935 | De Baufre. | |
| 2,557,171 | 6/1951 | Bodle et al. | |
| 2,582,148 | 1/1952 | Nelly | 62—23 X |
| 2,940,271 | 6/1960 | Jackson | 62—23 |

NORMAN YUDKOFF, *Primary Examiner.*

V. W. PRETKA, *Assistant Examiner.*